(12) United States Patent
Kandula et al.

(10) Patent No.: US 9,307,048 B2
(45) Date of Patent: Apr. 5, 2016

(54) SYSTEM AND METHOD FOR PROACTIVE TASK SCHEDULING OF A COPY OF OUTLIER TASK IN A COMPUTING ENVIRONMENT

(75) Inventors: Srikanth Kandula, Redmond, WA (US); Ganesh Ananthanarayanan, Berkeley, CA (US); Albert Greenberg, Seattle, WA (US); Yi Lu, Champaign, IL (US); Bikas Saha, Bellevue, WA (US); Edward Harris, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 417 days.

(21) Appl. No.: 12/979,338

(22) Filed: Dec. 28, 2010

(65) Prior Publication Data

US 2012/0167101 A1 Jun. 28, 2012

(51) Int. Cl.
 *G06F 9/46* (2006.01)
 *H04L 29/08* (2006.01)
 *G06F 9/50* (2006.01)

(52) U.S. Cl.
 CPC ............ *H04L 67/325* (2013.01); *G06F 9/5038* (2013.01); *G06F 9/5088* (2013.01); *G06F 2209/506* (2013.01)

(58) Field of Classification Search
 CPC ... H04L 67/325; G06F 9/5038; G06F 9/5088; G06F 2209/506
 USPC ............ 718/102, 106, 107; 709/226; 710/100
 See application file for complete search history.

(56) References Cited

U.S. PATENT DOCUMENTS

| 7,406,689 | B2 * | 7/2008 | Berstis et al. ................. 718/102 |
| 7,441,244 | B2 * | 10/2008 | Longobardi .................. 718/104 |
| 7,512,946 | B2 * | 3/2009 | MacLellan .................... 718/102 |
| 7,739,314 | B2 | 6/2010 | Datar et al. |
| 8,140,523 | B2 | 3/2012 | Fakhouri et al. |
| 8,219,546 | B2 | 7/2012 | Yan |
| 8,260,840 | B1 * | 9/2012 | Sirota et al. ................... 709/201 |
| 8,261,283 | B2 * | 9/2012 | Tsafrir et al. ................. 718/107 |
| 8,631,415 | B1 * | 1/2014 | Nadathur et al. ............. 718/105 |
| 2004/0131337 | A1 * | 7/2004 | Ono et al. ....................... 386/95 |
| 2005/0283534 | A1 | 12/2005 | Bigali et al. |

(Continued)

OTHER PUBLICATIONS

Koufakou, et al., "Fast Parallel Outlier Detection for Categorical Datasets using MapReduce", Retrieved at << http://ml.cecs.ucf.edu/dspace/bitstream/123456789/247/1/NN0897.pdf >>, IEEE International Joint Conference on Neural Networks, IJCNN, (IEEE World Congress on Computational Intelligence), Jun. 1-8, 2008, pp. 3297-3303.

(Continued)

*Primary Examiner* — Abu Z Ghaffari
(74) *Attorney, Agent, or Firm* — Sandy Swain; Micky Minhas

(57) ABSTRACT

The described implementations relate to distributed computing. One implementation provides a system that can include an outlier detection component that is configured to identify an outlier task from a plurality of tasks based on runtimes of the plurality of tasks. The system can also include a cause evaluation component that is configured to evaluate a cause of the outlier task. For example, the cause of the outlier task can be an amount of data processed by the outlier task, contention for resources used to execute the outlier task, or a communication link with congested bandwidth that is used by the outlier task to input or output data. The system can also include one or more processing devices configured to execute one or more of the components.

20 Claims, 8 Drawing Sheets

(56) References Cited

U.S. PATENT DOCUMENTS

| | | | |
|---|---|---|---|
| 2006/0288346 A1* | 12/2006 | Santos et al. | 718/102 |
| 2007/0143765 A1 | 6/2007 | Aridor et al. | |
| 2009/0055370 A1 | 2/2009 | Dagum et al. | |
| 2010/0115046 A1 | 5/2010 | Reddy Byreddy et al. | |
| 2010/0122053 A1* | 5/2010 | Prahlad et al. | 711/162 |
| 2010/0153960 A1 | 6/2010 | Youn et al. | |
| 2010/0169489 A1 | 7/2010 | Akiyama et al. | |
| 2010/0175049 A1 | 7/2010 | Ramsey et al. | |
| 2010/0179855 A1 | 7/2010 | Chen et al. | |
| 2011/0138055 A1 | 6/2011 | Daly et al. | |
| 2012/0011511 A1 | 1/2012 | Horvitz et al. | |
| 2012/0072199 A1 | 3/2012 | Kawahara | |
| 2012/0198466 A1 | 8/2012 | Cherkasova et al. | |
| 2012/0204180 A1* | 8/2012 | Santoli et al. | 718/101 |
| 2012/0290725 A1 | 11/2012 | Podila | |
| 2013/0179371 A1 | 7/2013 | Jain et al. | |
| 2013/0212277 A1 | 8/2013 | Bodik et al. | |

OTHER PUBLICATIONS

Polo, et al., "Performance-Driven Task Co-Scheduling for MapReduce Environments", Retrieved at << http://people.ac.upc.edu/dcarrera/papers/NOMS2010.pdf >>, 12th IEEE/IFIP Network Operations and Management Symposium (NOMS'10), Apr. 19-23, 2010, pp. 7.

Tan, Jiaqi., "Log-based Approaches to Characterizing and Diagnosing MapReduce Systems", Retrieved at << http://reports-archive.adm.cs.cmu.edu/anon/anon/home/ftp/2009/CMU-CS-09-143.pdf >>, CMU-CS-09-143, Jul. 2009, pp. 113.

Kavulya, et al., "An Analysis of Traces from a Production MapReduce Cluster", Retrieved at << http://www.pdl.cmu.edu/PDL-FTP/stray/CMU-PDL-09-107.pdf >>, CMU-PDL-09-107, Dec. 2009, pp. 18.

"Hadoop distributed filesystem", Retrieved at << http://hadoop.apache.org >>, Retrieved Date: Jul. 27, 2010, pp. 2.

Faraj, et al., "STAR-MPI: Self Tuned Adaptive Routines for MPI Collective Operations", Retrieved at << http://www.cs.arizona.edu/~dkl/research/papers/ics06.pdf >>, International Conference on Supercomputing, Proceedings of the 20th annual international conference on Supercomputing, Jun. 28-Jul. 1, 2006, pp. 10.

Greenberg, et al., "VL2: A Scalable and Flexible Data Center Network", Retrieved at << http://gk12net.uml.edu/blog/research/files/2010/02/VL2_A_Scalable_and_Flexible_Data_Center_Network.pdf >>, Applications, Technologies, Architectures, and Protocols for Computer Communication, Proceedings of the ACM SIGCOMM 2009 conference on Data communication, Aug. 16-21, 2009, pp. 12.

Andersen, et al., "Improving web availability for clients with monet", Retrieved at << http://repository.cmu.edu/cgi/viewcontent.cgi?article=1075&context=compsci >>, Proceedings of the 2nd conference on Symposium on Networked Systems Design & Implementation, vol. 2, May 2-4, 2005, pp. 15.

Ucar, et al., "Task assignment in heterogeneous computing systems", Retrieved at << http://graal.ens-lyon.fr/~bucar/papers/UcarAykanatKayalkinciJPDCv66n1.pdf >>, Journal of Parallel and Distributed Computing, vol. 66, No. 1, Jan. 2006, pp. 32-46.

Bairavasundaram, et al., "An analysis of data corruption in the storage stack", Retrieved at <<http://www.cs.utoronto.ca/~bianca/papers/fast08.pdf >>, Proceedings of the 6th USENIX Conference on File and Storage Technologies, Feb. 26-29, 2008, pp. 16.

Chaiken, et al., "SCOPE: Easy and Efficient Parallel Processing of Massive Datasets", Retrieved at http://www.cs.washington.edu/education/courses/cse444/08au/544M/Reading-List/Scope-2008.pdf , VLDB Endowment, Aug. 24-30, 2008, pp. 1-12.

Condie, et al., "Mapreduce online", Retrieved at <<http://www.usenix.org/event/nsdi10/tech/full_papers/condie.pdf >>, Nsdi Conference on Networked Systems Design and Implementation, Proceedings of the 7th USENIX conference on Networked systems design and implementation, Apr. 28-30, 2010, pp. 15.

Culler, et al., "LogP: Towards a Realistic Model of Parallel Computation", Retrieved at << http://parasol.tamu.edu/people/amato/Courses/626/references/logP.pdf >>, ACM SIGPLAN Notices, vol. 28, No. 7, Jul. 1993, pp. 1-24.

Dean, et al., "Simplified data processing on large clusters", Retrieved at << http://www.eecs.umich.edu/~klefevre/eecs584/Handouts/mapreduce.pdf >>, Communications of the ACM, 50th anniversary, vol. 51, No. 1, Jan. 2008, pp. 1-27.

Isard, et al., "Dryad: Distributed Data-parallel Programs from Sequential Building Blocks", Retrieved at << http://pdos.csail.mit.edu/6.824-2007/papers/isard-dryad.pdf >>, European Conference on Computer Systems, Proceedings of the 2nd ACM SIGOPS/EuroSys European Conference on Computer Systems, Mar. 21-23, 2007, pp. 14.

Isard, et al., "Quincy: Fair scheduling for distributed computing clusters", Retrieved at << http://www.sigops.org/sosp/sosp09/papers/isard-sosp09.pdf >>, ACM Symposium on Operating Systems Principles, Proceedings of the ACM SIGOPS 22nd symposium on Operating systems principles, Oct. 11-14, 2009, pp. 1-20.

Kandula, et al., "The Nature of Datacenter Traffic: Measurements and Analysis", Retrieved at http://research.microsoft.com/en-us/UM/people/srikanth/data/imc09_dcTraffic.pdf >>, IMC, Nov. 4-6, 2009, pp. 7.

Ko, et al., "On Availability of Intermediate Data in Cloud Computations", Retrieved at http://dprg.cs.uiuc.edu/docs/iss/hotos09.pdf >>, Proceedings of the 12th conference on Hot topics in operating systems, May 18-20, 2009, pp. 1-5.

Ko, et al., "Making cloud intermediate data fault-tolerant", Retrieved at <<http://keplercs.uiuc.edu/docs/iss-socc/socc077-ko.pdf >>, International Conference on Management of Data, Proceedings of the 1st ACM symposium on Cloud computing, Jun. 10 - 11, 2010, pp. 12.

Krishnamurthy, et al., "Analyses and optimizations for shared address space programs", Retrieved at << http://reference.kfupm.edu.sa/content/a/n/analyses_and_optimizations_for_shared_ad_126433.pdf >>, vol. 38, No. 2, 1996, pp. 20.

Al-Fares, et al., "A Scalable, Commodity Data Center Network Architecture", Retrieved at << http://www.cs.ucsb.edu/~ravenben/classes/276/papers/alv.pdf >>, SIGCOMM'08, Aug. 17-22, 2008, pp. 63-74.

Chien, et al., "MPI-FM: High Performance MPI on Workstation Clusters", Retrieved at http://reference.kfupm.edu.sa/content/m/p/mpi_fm_high_performance_mpi_on_workstat_123888.pdf , 1997 pp. 27.

Zaharia, et al., "Improving MapReduce Performance in Heterogeneous Environments", Retrieved at << http://www.cs.berkeley.edu/~matei/papers/2008/osdi_late.pdf , Proceedings of the 8th USENIX conference on Operating systems design and implementation, Dec. 8-10, 2008, pp. 29-42.

Olston, et al., "Pig Latin: A Not-So-Foreign Language for Data Processing", Retrieved at << http://research.yahoo.net/files/sigmod08.pdf >>, International Conference on Management of Data, Proceedings of the 2008 ACM SIGMOD international conference on Management of data, Jun. 9-12, 2008, pp. 12.

Patarasuk, et al., "Pipelined Broadcast on Ethernet Switched Clusters", Retrieved at http://citeseerx.ist.psu.edu/viewdoc/download?doi=10.1.1.72.4747&rep=rep1&type=pdf >>, 20th International Parallel and Distributed Processing Symposium, IPDPS, Apr. 25-29, 2006, pp. 10.

Pavlo, et al., "A comparison of approaches to large scale data analysis", Retrieved at <<http://www.cs.brandeis.edu/~olga/cs228/Reading%20List_files/benchmarks-sigmod09.pdf >>, International Conference on Management of Data, Proceedings of the 35th SIGMOD international conference on Management of data, Jun. 29-Jul. 2, 2009, pp. 14.

Rhea, et al., "Fixing the embarrassing slowness of opendht on planetlab", Retrieved at << http://cs.ucla.edu/~kohler/class/08w-dsi/rhea05fixing.pdf >>, Proceedings of the 2nd conference on Real, Large Distributed Systems, vol. 2, 2005, pp. 1-6.

Roy, et al., "Airavat: Security and privacy for mapreduce", Retrieved at http://citeseerx.ist.psu.edu/viewdoc/download?doi=10.1.1.161.3964&rep=rep1&type=pdf , 2009, pp. 1-15.

(56) References Cited

OTHER PUBLICATIONS

Sandholm, et al., "Mapreduce optimization using regulated dynamic prioritization", Retrieved at << http://www.hpl.hp.com/personal/Thomas_Sandholm/sandholm2009a.pdf >>, Joint International Conference on Measurement and Modeling of Computer Systems, Proceedings of the eleventh international joint conference on Measurement and modeling of computer systems, Jun. 15-19, 2009, pp. 12.

Sekar, et al., "Csamp: A system for network-wide flow monitoring", Retrieved at << http://www-2.cs.cmu.edu/~dga/papers/csamp-nsdi2008.pdf , In the Proceedings of Fifth USENIX Symposium on Networked Systems Design and Implementation, (NSDI), Apr. 2008, pp. 14.

Wischik, et al., "The resource pooling principle", Retrieved at http://www.cs.ucl.ac.uk/staff/D.Wischik/Research/respool.pdf >>, ACM SIGCOMM Computer Communication Review, vol. 38, No. 5, Oct. 2008, pp. 6.

Yu, et al., "Distributed Aggregation for Data-Parallel Computing: Interfaces and Implementations", Retrieved at << http://www.sigops.org/sosp/sosp09/papers/yu-sosp09.pdf , ACM Symposium on Operating Systems Principles, Proceedings of the Acm Sigops 22nd symposium on Operating systems principles, Oct. 11-14, 2009, pp. 1-17.

Yu, et al., "DryadLINQ: A System for General-Purpose Distributed Data-Parallel Computing Using a High-Level Language", Retrieved at << http://www.usenix.org/events/osdi08/tech/full_papers/yu_y/yu_y_html/ >>, In Proceedings of the 8th Symposium on Operating Systems Design and Implementation, (OSDI), Dec. 8-10, 2008, pp. 11.

Zaharia, et al., "Job scheduling for multi-user mapreduce clusters", Retrieved at << http://www.eecs.berkeley.edu/Pubs/TechRpts/2009/EEECS-2009-55.pdf >>, Technical Report, No. UCB/EECS-2009-55, Apr. 30, 2009, pp. 18.

Ahmad et al., "Semi-distributed load balancing for massively parallel multicomputer systems," IEEE Transactions on Software Engineering, vol. 17, No. 10, Oct. 1991, p. 987-1004.

Ananthanarayanan, et al., "Reigning in the outliers in map-reduce clusters using Mantri," Techical Report MSR-TR-210-69, Microsoft Research, 2010, 24 pages.

Graham, R.L., "Bounds on multiprocessing time anomalies," SIAM Journal on Applied Mathematics, vol. 17, No. 2, 1969 14 pages.

Kandula, et al., "Walking the Tightrope: Responsive Yet Stable Traffic Engineering," SIGCOMM'05, Aug. 21-26, 2005, 12 pages.

Manoharan, S., "Effect of task duplication on assignment of dependency graphs," Parallel Computing 27 (2001), pp. 257-268.

Kwon, et al., "Skew-Resitant Parallel Processing of Feature-Extracting Scientific User-Defined Functions," SoCC'10, Jun. 10-11, 2010, 12 pages.

Ananthanarayanan, G. et al; "Reining in the Outliers in Map-Reduce Clusters using Mantri"; OSDI'10 Proceedings of the 9th USENIX Conference on Operating Systems Design and Implementation, 2010 Article No. 1-16, 14 pages.

Ferguson et al., "Jockey: Guaranteed Job Latency in Data Parallel Clusters," EuroSys'12, Apr. 10-13, 2012, Bern Switzerland, 14 pages.

Park et al., "Predictable Time-Sharing for DryadLINQ Cluster," Proceedings fo 7th International Conference on Autonomic Computing, 2010, 10 pages.

Park, Sang-Mini "Feedback-Controlled, Virtualized Resource Sharing for Predictable E-Science," Published May 2010, Available at: cs.virginia.edu/~sp2kn/paper/Disseration.pdf, 138 pages.

Nassif et al., "Job Completion Prediction in Grid using Distributed Case-based Reasoning," Proceedings of 14th IEEE International Workshops on Enabling Technologies: Infrastructure for Collaborative Enterprise, Jun. 13-15, 2005, 6 pages.

Bekooij et al., "Predictable and Composable Multiprocessor System Design: A Constructive Approach," Proceedings of Bits&Chips Symposium on Embedded Systems and Software, 2007, 14 pages.

Barker et al., "Empirical Evaluation of Latency-sensitive Application Performance in the Cloud," Proceedings of the First Annual ACM SIGMM Conference on Multimedia Systems, Feb. 22-23, 2010, 12 pages.

Govind et al., "Estimating Expected Completion Times with Probabilistic Job Routing," Proceedings of the Winter Simulation Conference, Dec. 3-6, 2006, pp. 1804-1810, 7 pages.

Amdahl, G.M., "Validity of the single processor approach to achieving large scale computing capabilities," Proc. AFIPS '67(Spring ), cs.utexas.edu/~dburger/cs395t/papers/5_amdahl.pdf>>, 4 pages.

Anderson et al., "Value-Maximizing Deadline Scheduling and its Application to Animation Rendering," Proc. SPAA '05, Jul. 18-20, 2005, hpl.hp.com/research/ssp/papers/2005-spaa-scheduling.pdf>>, 10 pages.

Borthakur et al., "Apache Hadoop goes Realtime at Facebook," SIGMOD '11, Jun. 12-16, 2011, borthakur.com/ftp/RealtimeHadoopSigmod2011.pdf>>, 10 pages.

Ghemawat et al., "The Google file system," SIGOPS Oper.Syst. Rev., 37(5), Oct. 19-22, 2003, ://static.googleusercontent.com/external_content/unturusted_dlcp/labs.ggogle.com/en//papers/gfs-sosp2003.pdf>>, 15 pages.

Herodotou et al., "No One (Cluster) Size Fits All: Automatic Cluster Sizing for Data-intensive Analytics," Proc. SOCC '11, Oct. 27-28, 2011, prophet.cs.duke.edu/~hero/files/socc1-cluster-sizing.pdf>>, 14 pages.

Li et al., "CloudCmp: Comparing Public Cloud Providers," Proc. IMC'10, Nov. 1-3, 2010, //www.cs.duke.edu/~angl/papers/imc10-cloudcmp.pdf>>, 14 pages.

Morton et al, "Paratimer: A Progress Indicator for MapReduce DAGs," Proc. SIGMOD 10, Jun. 6-11, 2010, //event.cwi.nl/SIGMOD-RWE/2010/21-92473b/paper.pdf>>, 12 pages.

Murray et al., "CIEL: a universal execution engine for distributed data-flow computing," Proc. NSDI'11, ://www.cl.cam.ac.uk/~ms705/pub/papers/2011-ciel-nsdi.pdf>>, 14 pages.

Thusoo et al., "Hive: A Warehousing Solution Over a Map-Reduce Framework," Proc. VLDB Endow., 2009, www.utdallas.edu/~mxk055100/courses/cloud11f_files/hive.pdf>>, 4 pages.

Urgaonkar et al., "Dynamic Provisioning of Multi-tier Internet Applications," Proc. ICAC, 2005, ieeexplore.ieee.org/stamp/stamp.jsp?tp=&arnumber=1498066>>, 12 pages.

Verma et al., "SLO-Driven Right-Sizing and Resource Provisioning of MapReduce Jobs," Proc. LADIS '11, 2011, verma7.com/pdfs/LADIS11_ARIA.pdf>>, 6 pages.

Wang et al., "The Impact of Virtualization on Network Performance of Amazon EC2 Data Center," Proc. INFOCOM 'citeseerx.ist.psu.edu/viewdoc/download?doi=10.1.1.158.9814&rep=rep1&t type=pdf>>, 9 pages.

Zaharia et al., "Delay Scheduling: A Simple Technique for Achieving Locality and Fairness in Cluster Scheduling," Proc. EuroSys '10, Apr. 13-16, 2010, .research.yahoo.net/files/eurosys_delay_scheduling.pdf>>, 14 pages.

Chambers et al., "FlumeJava: Easy, Efficient Data-Parallel Pipelines," Proc. PLDI '10, Jun. 5-10, 2010, 13 pages.

Non-Final Office Action mailed May 9, 2014 from U.S. Appl. No. 13/372,717, 19 pages.

Response filed Sep. 9, 2014 to Non-Final Office Action Dated May 9, 2014 from U.S. Appl. No. 13/372,717, 12 pages.

Final Office Action mailed Nov. 13, 2014 from U.S. Appl. No. 13/372,717, 18 pages.

Response filed Feb. 4, 2015 to Final Office Action Dated Nov. 13, 2014 from U.S. Appl. No. 13/372,717, 16 pages.

Ananthanarayanan et al., "Scarlett: Coping with Skewed Content Popularity in MapReduce Clusters," EuroSys'11, Salzburg, Austria, Apr. 10-13, 2011, 14 pages.

Lumezanu et al., "Online Optimization for Latency Assignment in Distributed Real-Time Systems," ICDCS '08, Jun. 2008, 8 pages.

Ravindran et al., "Adaptive Resource Management in Asynchronous Real-Time Distributed Systems using Feedback Control Functions," The Fifth IEEE International Symposium on Autonomous Decentralized Systems, Jan. 2001, pp. 39-46, 9 pages.

(56) References Cited

OTHER PUBLICATIONS

Sandholm et al., "Prediction-Based Enforcement of Performance Contracts," GECON '07, Rennes, France, 2007, 13 pages.

Sandholm et al., "A Statistical Approach to Risk Mitigation in Computational Markets," HPDC '07, Jun. 25-29, 2007, Monterey, CA, USA, 11 pages.

Xuan et al., "Utilization-Based Admission Control for Real-Time Applications," ICPP '10, Washington, DC, USA, 2000, 10 pages.

Notice of Allowance and Examiner Initiated Interview Summary mailed Oct. 8, 2015 from U.S. Appl. No. 13/372,717, 16 pages.

Agashe, Shripad, "Predictive Analysis Using Critical Path Method and Amdahl's Law," Infosys Technologies Limited, 6 pages.

Kwok et al., "Dynamic Critical-Path Scheduling: An Effective Technique for Allocating Task Graphs to Multiprocessors," IEEE Transactions on Parallel and Distributed Systems, vol. 7, No. 5, May, 1996, 16 pages.

* cited by examiner

SYSTEM AND METHOD FOR PROACTIVE TASK SCHEDULING OF A COPY OF OUTLIER TASK IN A COMPUTING ENVIRONMENT

BACKGROUND

Distributed computing techniques can be used to speed up processing of computer applications by distributing workloads across numerous processing devices. Often, the workloads are organized into "jobs" that include individual "tasks" suitable for execution on a single device. Distributed computing techniques can allow jobs to be completed in relatively short periods of time by concurrently executing tasks of a job on different computing devices. However, in some cases, dependencies exist such that some tasks cannot be started until other tasks have finished. Because of these dependencies, not all tasks can be executed concurrently, which can slow down the processing of jobs in distributed computing systems. This problem can be compounded when a particular task runs for a long time, because other tasks with dependencies on the long-running task cannot start executing until the long-running task has completed.

One approach to mitigating the impact of dependencies in a distributed system is to duplicate long-running tasks. For example, a new copy of a long-running task may be instantiated on another computing device in the distributed system. Often, the copy of the long-running task will complete before the original copy of the long-running task, thus enabling other tasks with dependencies on the long-running task to begin executing sooner than would be possible by waiting for the long-running task to complete. However, in some cases, task duplication can have negative consequences, because task duplication generally requires using computing resources that would otherwise be available for other tasks that do not have such dependencies.

SUMMARY

The described implementations relate to distributed computing. One implementation is manifested as a system that can include an outlier detection component that is configured to identify an outlier task from a plurality of tasks based on runtimes of the plurality of tasks. The system can also include a cause evaluation component that is configured to evaluate a cause of the outlier task. For example, the cause of the outlier task can be an amount of data processed by the outlier task, contention for resources used to execute the outlier task, or a communication link with congested bandwidth that is used by the outlier task to input or output data. The system can also include one or more processing devices configured to execute one or more of the components.

Another implementation is manifested as one or more computer-readable storage media having stored instructions to cause one or more processors to perform monitoring execution of a plurality of tasks associated with a job. The stored instructions can also cause the one or more processors to perform determining whether to schedule a copy of an individual one of the tasks based on an estimated remaining time for the individual task to complete. The copy can include a duplicate of the individual task or a kill and restart of the individual task.

Another implementation is manifested as a technique that can involve identifying an amount of data that is input or output by individual tasks associated with a job. The technique can also include identifying available bandwidth for input or output of data by one or more processing devices, and comparing the amount of data to the available bandwidth. The technique can also include scheduling the individual tasks on individual processing devices based on the comparing.

The above listed examples are intended to provide a quick reference to aid the reader and are not intended to define the scope of the concepts described herein.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced.

DETAILED DESCRIPTION

Overview

Figure 1:
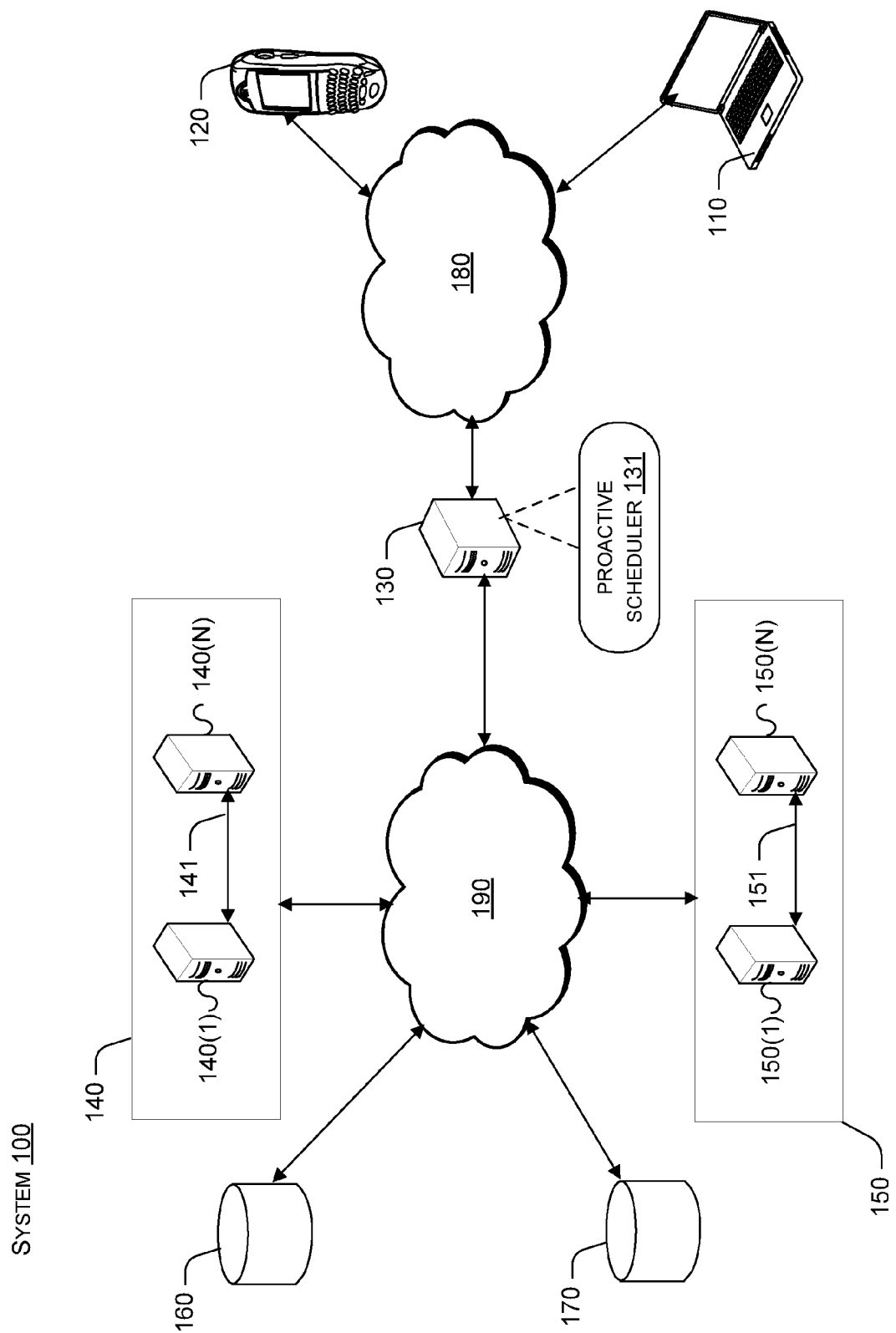
FIG. 1 shows an example of an operating environment in accordance with some implementations of the present concepts.

The described implementations relate to distributed computing, and more specifically to scheduling tasks and/or jobs on one or more devices. For the purposes of this document, a "job" is a unit of work performed by one or more devices. A job can include individual "tasks" that are suitable for execution on a single device. In many cases, a single job can include tasks that are concurrently executing on different devices. For the purposes of this document, "concurrently executing" can mean that two tasks have at least some overlap in execution, e.g., one task is executing on a first processing device for at least some of the time that a second task is executing on a second processing device. In some implementations, the processing devices can include individual servers of one or more server racks.

Tasks can be assigned to execute in "slots" on a device. Assigned slots can represent tasks that have been scheduled to execute on a particular device. Unassigned slots can represent availability of at least one processing device to be assigned to execute a task.

The tasks of a particular job can also have certain dependencies. For example, a first task may need to complete before a second, subsequent task can begin, e.g., the second task uses the output of the first task as an input. Tasks with such dependencies can be grouped into "processing phases" or "phases," such that the tasks in one phase can be dependent on certain tasks in the previous phase.

Certain tasks within a phase can take substantially longer to complete than other tasks in the same phase. For the purposes of this document, such a task can be considered an "outlier." The term "outlier" can include stragglers, e.g., tasks that are processing data more slowly than other tasks. The term "outlier" can also include tasks that are processing data at a normal rate, but take a long time to complete due to having large amounts of data to process. As discussed in more detail below, the disclosed implementations can identify what circumstances are causing a particular task to be an outlier, e.g., large amounts of data to process, contention for machine resources, etc. Depending on the identified cause for the outlier, different scheduling actions can be taken to mitigate the outlier's impact on job completion time.

As a specific example, consider a task that is executing on a first device with a heavy processing load. Under such circumstances, it can be useful to restart or duplicate the task on a second device that does not have a heavy processing load, because this can speed completion of the task. However, if the outlier is instead caused by the task having a large amount of data to process, duplicating or restarting the task on a second device may not cause the job to complete any faster. Under these circumstances, the task may not complete any sooner on the second device than on the first device. Here, the resources of the second device may be more effectively utilized for another task, rather than restarting or duplicating the outlier on the second device. The implementations set forth herein provide for identifying causes of outlier tasks and scheduling tasks on various devices in view of the identified causes of the outliers.

FIG. 1 shows an exemplary system 100 that is consistent with the disclosed implementations. As shown in FIG. 1, system 100 includes numerous devices such as client devices 110 and 120, scheduling server 130, server racks 140 and 150, and databases 160 and 170. Each device shown in FIG. 1 can include one or more computer processors executing instructions in a memory, as well one or more non-volatile storage devices.

Client devices 110 and 120 can be configured to request application services from scheduling server 130. For example, client devices 110 and 120 can access scheduling server 130 by communicating over network 180. In some implementations, scheduling server 130 can receive queries from client devices 110 and/or 120, schedule jobs and/or tasks on server racks 140 and 150 to retrieve responses to the queries, and send the query responses to the requesting client device.

As a particular example, scheduling server 130, server racks 140 and 150, and databases 160 and 170 can be associated with a web search engine. In such an implementation, client devices 110 and 120 can be configured to submit web search queries to scheduling server 130. In an implementation where devices 130-170 are associated with a web service such as a search engine, network 180 can include the Internet, and can be implemented using wired or wireless technologies.

Scheduling server 130 can be configured to receive the requests from client devices 110 and 120, schedule one or more jobs on server racks 140 and/or 150 and provide client devices 110 and/or 120 with results of the jobs. In the case of a web search engine, the results may include one or more web pages that match the received queries. Scheduling server 130 can also include a proactive scheduler 131 for scheduling of the jobs on server racks 140 and 150, as discussed in more detail below. For the purposes of clarity, each request received from a client device can correspond to an individual job scheduled by scheduling server 130. However, in other implementations, more than one client request can be associated with a single job, or multiple jobs can be associated with a single client request.

Server racks 140 and 150 can be configured to execute the jobs that are scheduled by scheduling server 130. For example, server rack 140 can include individual servers 140(1) through 140(n), and server rack 150 can include individual servers 150(1) through 150(n). The individual servers can be configured to retrieve data from databases 160 and 170, process the data, and provide query results to scheduling server 130.

Server rack 140 may include an intra-rack communication link 141, which connects each of the respective individual servers 140(1) through 140(n). Likewise, server rack 150 may include an intra-rack communication link 151 connecting individual servers 150(1) through 150(n).

Databases 160 and 170 can be configured to store data associated with the application provided by scheduling server 130. In the case of a web search engine, databases 160 and 170 can include various web pages that are indexed by search terms, date/time the web pages were created, etc. For example, databases 160 and 170 can include files such as structured query language ("SQL") databases, text files, comma-separated value ("CSV") files, spreadsheets, Microsoft Access™ databases, etc.

Devices 130-170 can communicate over network 190. In the case of a web search engine, network 190 can be an intranet associated with the search engine, e.g., a local-area network (LAN) or a wide-area network (WAN). Network 190 can be implemented using wireless and/or wired technologies. In some implementations, network 190 has less available bandwidth than intra-rack communication links 141 and 151. In such implementations, proactive scheduler 131 can be configured to take the relative bandwidth of these communications into account when scheduling tasks on particular individual servers. For example, under some circumstances, proactive scheduler 131 can move tasks between individual servers of a server rack, rather than moving the tasks across network 190 to a different server rack.

Generally speaking, scheduling server 130, server racks 140 and 150, and databases 160 and 170 are representative of various back-end computing architectures. This document uses the term "cluster" to collectively refer to scheduling server 130, server racks 140 and 150, and databases 160 and 170. Note that the term "cluster" as used herein is not inconsistent with various distributed computing implementations such as cloud computing, grid computing, etc.

Figure 2:
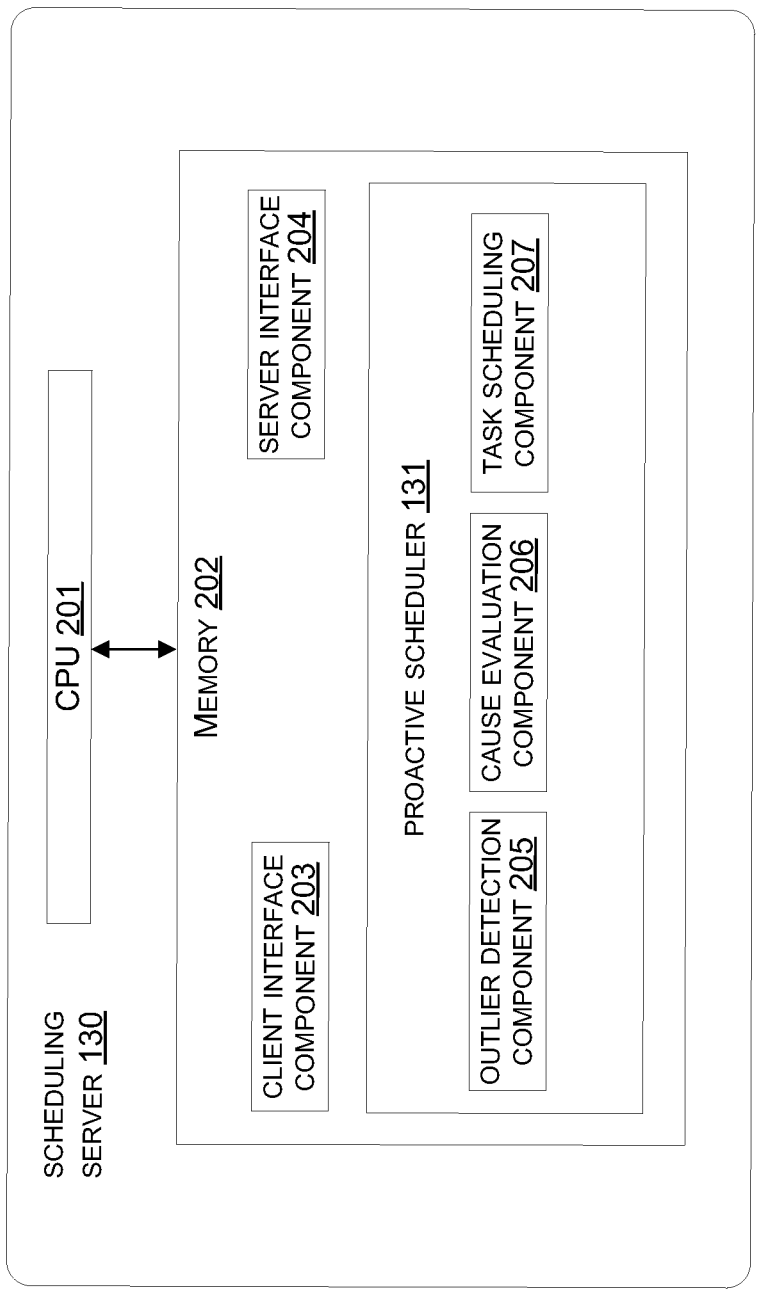
FIG. 2 shows exemplary components of a device in accordance with some implementations of the present concepts.

FIG. 2 shows an exemplary architecture of scheduling server 130 that is configured to accomplish the concepts described above and below. Scheduling server 130 can include a processing device such as a central processing unit ("CPU") 201, operably connected to a volatile or non-volatile memory 202. For example, CPU 201 can be a reduced instruction set computing (RISC) or complex instruction set computing (CISC) microprocessor that is connected to memory 202 via a bus. Memory 202 can be a volatile storage device such as a random access memory (RAM), or non-volatile memory such as FLASH memory. Although not shown in FIG. 2, scheduling server 130 can also include various input/output devices, e.g., keyboard, mouse, display, printer, etc. Furthermore, scheduling server 130 can include one or more non-volatile storage devices, such as a hard disc drive (HDD), optical (compact disc/digital video disc) drive, tape drive, universal serial bus (USB) drive (e.g., flash memory stick), etc. Generally speaking, data processed by scheduling server 130 can be stored in memory 202, and can also be committed to non-volatile storage. For the purposes of this document, the term "computer-readable storage media" can include both volatile and non-volatile storage devices.

Memory 202 of scheduling server 130 can include various components that implement certain processing described herein. For example, memory 202 can include a client interface component 203, a server interface component 204, and proactive scheduler 131. Proactive scheduler 131 can include an outlier detection component 205, a cause evaluation component 206, and a task scheduling component 207. Components 131 and 203-207 can include instructions stored in memory 202 that can be read and executed by central processing unit (CPU) 201. Furthermore, components 131 and 203-207 can also be stored in non-volatile storage and retrieved to memory 202 to implement the processing described herein. In some implementations, such instructions may be read directly from nonvolatile storage directly to CPU 201 without necessarily being first stored in memory 202.

Client interface component 203 can be configured to communicate with client devices 110 and/or 120 using various technologies. For example, client interface component 203 can use transmission control protocol ("TCP"), internet protocol ("IP"), and/or combinations thereof ("TCP/IP") to communicate with client devices 110 and 120. Client interface component 203 can also implement hypertext transfer protocol ("HTTP") for web communications such as the aforementioned queries and query responses, for example in implementations where scheduling server 130 provides web service functionality.

Server interface component 204 can be configured to communicate with the individual servers of server racks 140 and 150. For example, scheduling server 130 can implement techniques such as Dryad™ or MapReduce™ scheduling to control the execution of jobs and/or tasks on the individual servers. Server interface component 204 can be configured to issue appropriate scheduling commands and/or receive query results from the individual servers of server racks 140 and 150.

Proactive scheduler 131 can be configured to control scheduling of jobs on the individual servers 140(1 . . . N) and/or 150(1 . . . N). For example, proactive scheduler 131 can be configured to assign the jobs in individual tasks that are suitable for execution by an individual server. As discussed in more detail below, proactive scheduler 131 can be configured to schedule the tasks based on processing performed by components 205-207. More generally, proactive scheduler 131 is but one example of a resource-aware component that can vary certain processing actions for outliers based on the availability of spare resources or other pending tasks.

Outlier detection component 205 can be configured to identify outliers, or tasks that are predicted and/or appear to be taking longer than expected to complete on the individual servers. For example, outlier detection component 205 can be configured to identify one or more outlier tasks of a job based on actual or expected runtimes for the tasks of the job. In some implementations, outliers are identified by determining the amount of data being processed by particular tasks, calculating an expected completion time based on the amount of data being processed, and identifying those tasks that are taking substantially longer than expected as outliers.

Cause evaluation component 206 can be configured to determine expected causes for the outliers. For example, cause evaluation component 206 can be configured to determine whether a particular task is an outlier because the task has a large amount of data to process (e.g., data skew), is competing with other tasks for computational resources (e.g., memory or CPU) on an individual server, or is unable to process the task quickly due to network bandwidth constraints that may be slowing or stopping the task when obtaining input data (e.g., over network 190 or intra-rack communication links 141 and/or 151).

Task scheduling component 207 can be configured to schedule tasks based on the causes of outliers identified by cause evaluation component 206. For example, task scheduling component 207 can be configured to start tasks that have large amounts of data to process before other tasks. Task scheduling component 207 can also be configured to duplicate and/or kill or restart outlier tasks that are competing with other tasks for computational resources. Task scheduling component 207 can also be configured to select individual servers where outliers are duplicated and/or restarted based on bandwidth available over network 190 and/or intra-rack communication links 141 and/or 151. For outliers that are unable to obtain input/output data or are only able to do so slowly due to bandwidth congestion, task scheduling component 207 can be configured to replicate the outliers or pre-compute values for the outliers. The individual server assigned to replicate the outlier or pre-compute the values can also be selected based on network conditions, e.g., bandwidth available over network 190 and/or the intra-rack communication link(s).

Figure 3:
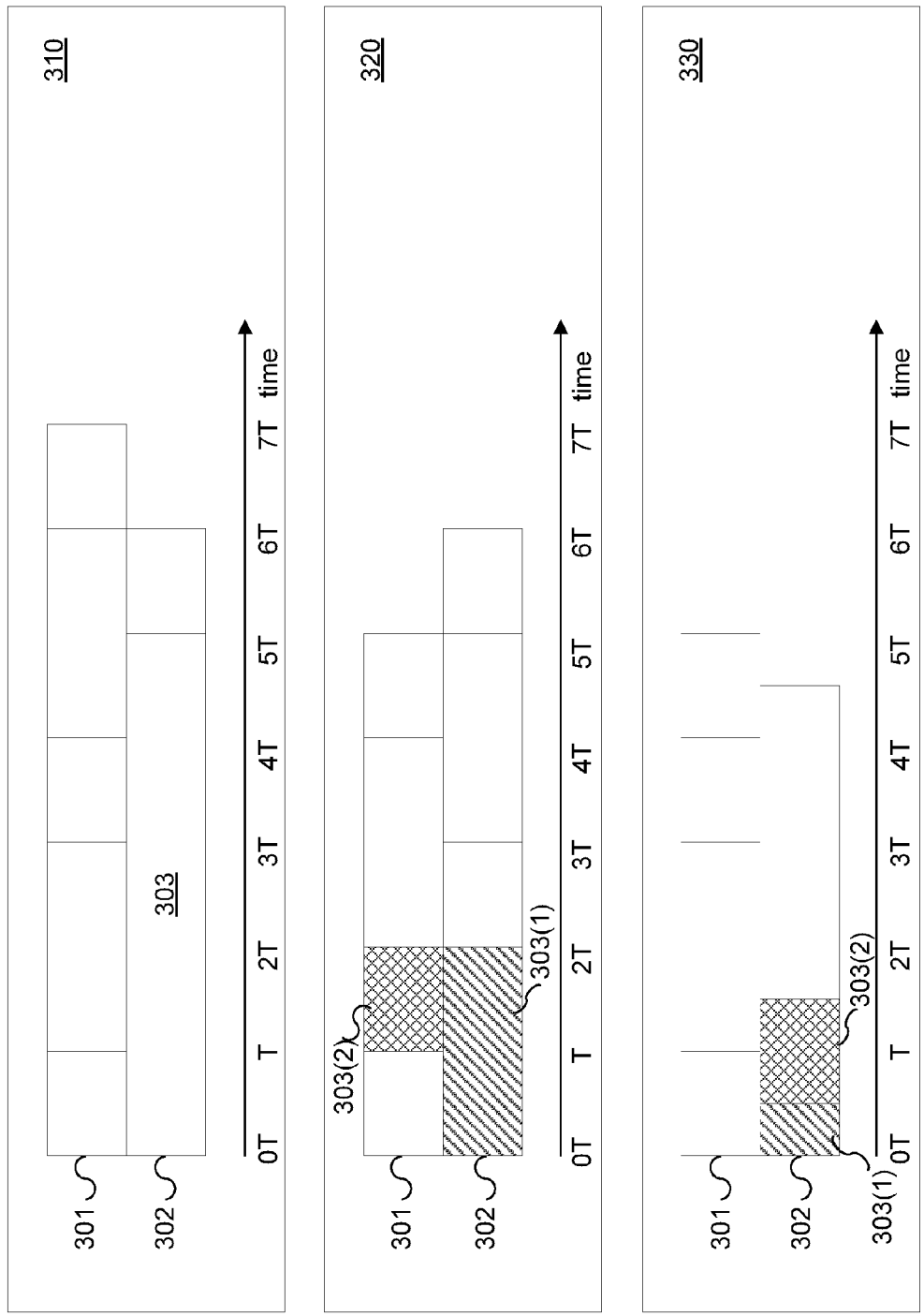
FIG. 3 shows exemplary task schedules that can be generated using some implementations of the present concepts.

FIG. 3 illustrates three exemplary schedules 310, 320, and 330, such as can be generated by task scheduling component 207. Each schedule can include two slots, 301 and 302. Slots 301 and 302 can, for example, represent available slots for processing tasks on individual servers 140(1 . . . N) and/or 150(1 . . . N). Each schedule is illustrated along a time axis, with individual tasks represented as blocks in one of slots 301 or 302. For the purposes of exposition, slot 301 can represent processing performed over time by individual server 140(1), and slot 302 can represent processing performed over time by individual server 140(N). In some implementations, however, slots are maintained in a pool of available slots and are not assigned to individual servers until tasks are scheduled.

Schedule 310 generally illustrates a basic scheduling algorithm, for example, random assignment of tasks to slots on individual servers. Each task shown in schedule 310 runs in time T seconds or 2T seconds, as shown by the relative width of each task. However, task 303 takes 5T seconds to complete. Schedules 320 and 330 generally illustrate schedules that can be generated by proactive scheduler 310, and can take less time to complete than schedule 310.

Figure 4:
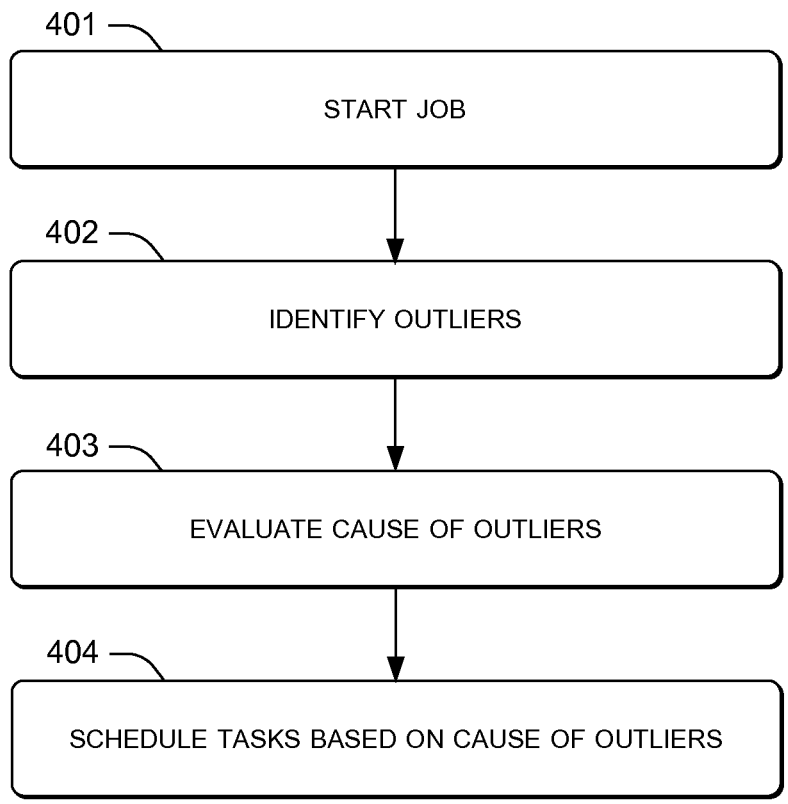
FIGS. 4-8 show flowcharts of exemplary methods that can be accomplished in accordance with some implementations of the present concepts.

FIG. 4 illustrates a method 400 for scheduling tasks. For example, proactive scheduler 131 can generate schedules 320 and/or 330 using method 400. Note, however, that method 400 is shown as being implemented by proactive scheduler 131 for exemplary purposes, and is suitable for implementation in various other contexts. Furthermore, method 400 is discussed with respect to system 100, but is also suitable for implementation in various other systems.

A job is started at block 401. For example, scheduling server 130 can receive a request from client device 110 and/or 120, and create a new job that includes a number of individual tasks. Generally speaking, schedules 310, 320, and 330 show three different schedules that can be used to complete the job.

Outlier tasks are identified at block 402. For example, outlier detection component 205 can compare the actual runtimes and/or expected runtimes of the various tasks. Thus, outlier detection component 205 can identify task 303 as a potential outlier, as task 303 runs for 5T seconds, whereas other tasks in the job take 2T seconds or less to complete.

Causes of outlier tasks are evaluated at block 403. For example, cause evaluation component 206 can evaluate why task 303 has a substantially longer actual or expected runtime than other tasks in the job. As one example, task 303 can have proportionally more input data to process than other tasks in the job, e.g., five times more input data than a task taking N seconds to complete. As another example, task 303 can be executing on an individual server that has a heavy processing load, and is competing with other tasks for resources such as processor and/or memory on the individual server.

Tasks can be scheduled based on the causes of outliers at block 404. For example, task scheduling component 207 can schedule the tasks of the job differently, depending on what is causing task 303 to be an outlier. If task 303 is caused by proportionally large amounts of input data, task scheduling component 207 can continue to let task 303 run in place on individual server 140(N). Under these circumstances, duplicating task 303 on another individual server, or killing task 303 on individual server 140(N) and restarting task 303 on another individual server may not be beneficial. This is because task 303 is expected to take 5T seconds to complete even when there is no resource contention, because of the relatively large amount of input data. Under some circumstances, task scheduling component 207 can schedule a task from a subsequent processing phase instead of duplicating and/or killing and restarting an outlier caused by large amounts of input data.

However, if the identified cause at block 403 is contention for resources on individual server 140(N), task scheduling component 207 can reschedule task 303, for example, as shown in schedules 320 and/or 330. Schedule 320 illustrates duplicating task 303 by initiating a duplicate task (e.g., a new copy of the task) in slot 301, e.g., on individual server 140(1). Note that FIG. 3 illustrates the original copy of task 303 as 303(1) in slot 302, and the duplicate copy of task 303 as 303(2) in slot 301.

By duplicating task 303 as shown in schedule 320, task 303 can be assigned to an individual server that does not have the resource contention problems discussed above. Thus, note that task 303(2) only takes T seconds to complete, as task 303(2) starts at T seconds and completes at 2T seconds. Once task 303(2) completes, task 303(1) can be killed in slot 302, since there may be no reason to continue executing the original copy of the task. Note that the total runtime for task 303 in schedule 320 is only 3T seconds (2T for task 303(1) and T for task 303(2)), as compared with 5T for schedule 310.

Schedule 330 is an alternative schedule that can be generated by task scheduling component 207. Schedule 330 generally illustrates killing and restarting a task. Schedule 330 illustrates killing task 303(1) and restarting the task in place as task 303(2). Schedule 330 can be generated by task scheduling component 207, for example, when the identified cause of task 303 as an outlier is network congestion. The network congestion can be due to restricted bandwidth on one or more of network 190 and/or intra-rack communication links 141 and/or 151.

Consider a circumstance where individual server 140(N) is reading input data from database 160 over network 190. In circumstances where communications between individual server 140(N) and database 160 are constrained by low bandwidth, this could also cause task 303 to take a long time to complete. However, note that the problem here is not necessarily due to local resource competition on individual server 140(N), but rather availability of input data over network 190.

If an alternative source of input data is available, e.g., database 170, and the alternative source does not have the same bandwidth constraints as the original source, it can be useful to restart the task in place, using the alternative input data source. Thus, schedule 330 shows that task 303(1) can be killed because it is accessing input data over the constricted link to database 160, and restarted as task 303(2) which accesses the input data using a faster connection with database 170.

Note also that method 400 can be performed in an iterative fashion. For example, block 401 can be performed each time a new job is created on scheduling server 130. Blocks 402, 403, and 404 can be performed iteratively for each task within a job. Thus, there is not necessarily a one-to-one correspondence between the number of times each block of method 400 is performed. Rather, method 400 as shown FIG. 4 is a general illustration of one processing flow that is consistent with the disclosed implementations. This is also the case for methods 500-800, shown in FIGS. 5-8.

Task Restarts and Duplications

As discussed above, proactive scheduler 131 can schedule outlier tasks based on the identified cause of the outlier. For example, proactive scheduler 131 can implement method 400, as discussed above. Also as discussed above, outlier tasks caused by resource contention can be killed and restarted in the same slot (i.e., without using an additional slot), and/or duplicated on another individual server in another slot.

Figure 5:
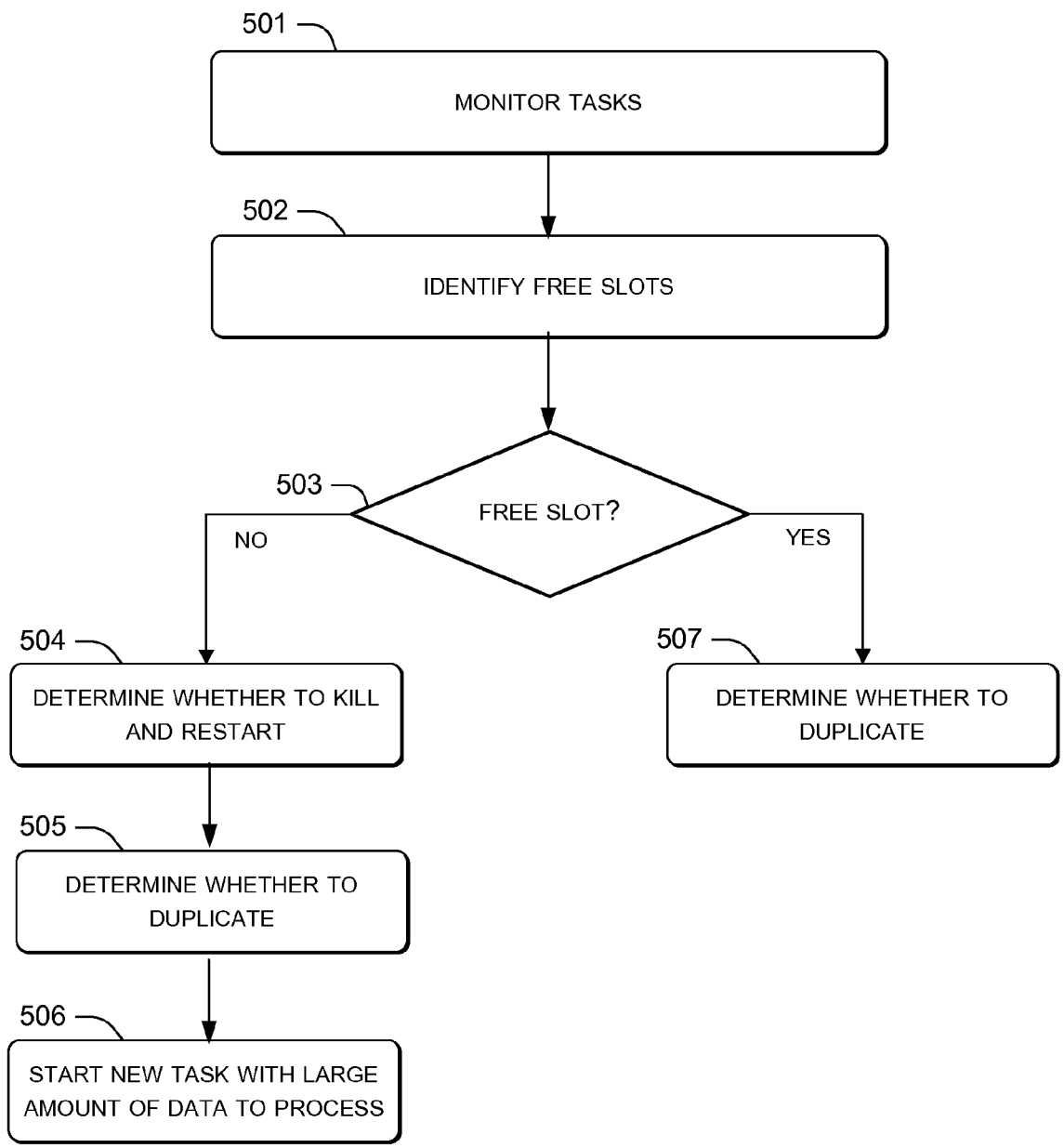

FIG. 5 illustrates a method 500 for predictively scheduling tasks by killing and restarting and/or duplicating certain tasks. For example, method 500 can be considered a detailed view of block 404 of method 400. Thus, proactive scheduler 131 can generate schedules such as 320 and/or 330 using method 500. Note, however, that method 500 is shown as being implemented by proactive scheduler 131 for exemplary purposes, and is suitable for implementation in various other contexts. Furthermore, method 500 is discussed with respect to system 100, but is also suitable for implementation in various other systems.

Tasks are monitored at block 501. For example, task scheduling component 207 of proactive scheduler 131 can receive periodic progress reports from tasks executing on individual servers 140(1 . . . N) and/or 150(1 . . . N). The progress reports can include data such as the number of data inputs to the task, the amount (e.g., percentage) of the task that has completed, how long the task has been executing, etc. The progress reports can also include resource utilization information such as processor and/or memory utilization by the reporting task as well as other tasks executing on the individual server.

Free slots can be identified at block 502. For example, in some implementations, each slot available for a task on individual servers 140(1 . . . N) and/or 150(1 . . . N) has been scheduled for a task, no free slots are available. Otherwise, there is a free slot available for a task. Furthermore, in some implementations, free slots can be determined using a quota system, where each job is limited to a number of slots defined by a quota. Under some circumstances, a job can use more slots than are defined by the quota, e.g., if there are available resources that are not used or requested by other jobs.

Decision block 503 can include selection logic for further processing, depending on whether a free slot is available. As shown in FIG. 5, if no free slots are available, method 500 continues to block 504. Otherwise, if a free slot is available, method 500 continues to block 507.

A determination can be made whether to kill or restart a task at block 504. For example, task scheduling component 207 can compare an estimated remaining time for a task to an estimated time for a new copy of the task to complete. The estimated remaining time can be based on the progress report received from a task, and the estimated time for a new copy can be based on the amount of input data being processed by the task. The estimated remaining time can also be based on progress reports from other tasks in the same phase, which may execute the same code and therefore be expected to process data at approximately the same rate as the task being considered for kill/restart at block 504. Based on the comparison of the estimated remaining time to the estimated time for the new copy, the task can be killed and restarted on the same individual server. For example, task scheduling component 207 can determine a likelihood that a restarted task will finish sooner than the currently executing copy of the task that provided the report. In some implementations, the restarted task is scheduled in the slot that becomes available when the currently executing copy of the task is killed.

A determination can be made whether to duplicate a task at block 505. For example, if the task is not killed and restarted at block 504, task scheduling component 207 can compare the estimated remaining time for the currently executing copy of the task to the estimated time for a new copy of the task to complete. The task can be duplicated when the estimated time for the new copy of the task to complete is substantially less than the estimated time for the currently executing copy (e.g., 50% or less), as discussed in more detail below. In some implementations, the duplicate task is scheduled the next time a new slot becomes available.

A new task can be started at block 506. For example, if no task is killed and restarted at block 504 and/or duplicated at block 505, a new task can be started. In some implementations, available tasks from the currently executing phase and/or a subsequent phase are evaluated based on the amount of data the available tasks will need to process before completing. A task with the large amount of data (e.g., the most) to be processed relative to other tasks can be started at block 506.

As discussed, if a free slot is available to start a task, method 500 can proceed to block 507. A determination can be made whether to duplicate a task at block 507. For example, task scheduling component 207 can determine the difference between the estimated time for a new task to complete to the estimated time for the currently executing time for the task to complete. If the difference exceeds a predetermined threshold, the task can be duplicated in the next available slot.

Note that the threshold used at block 507 can be set so that proactive scheduler 131 is more likely to duplicate a task when a free slot is available. This is because the free slot is an indication that there are unused resources that can be used to duplicate the task, and the duplicate task may finish more quickly than the original copy of the task. Furthermore, tasks that are processing data slowly can also be killed and restarted even when there is a free slot in which these tasks can be duplicated.

A specific algorithm is set forth below for implementing method 500. For the purposes of the algorithm set forth below, the following variables are defined:

t: an individual task
$t_{rem}$: an estimated remaining time for a task to complete
$t_{new}$: a predicted completion time of a new copy of the task
P: probability function Tasks can be restarted either by kill and restart or by duplication based on an estimated probability of success, considering the estimated times to completion for the current copy and a restarted and/or duplicate copy discussed above. Success, in this context, generally means that ($t_{new} < t_{rem}$). Thus, when $P(t_{new} < t_{rem})$ is relatively high, proactive scheduler 131 can kill and restart a task, e.g., at block 404 of method 400 and/or block 504 of method 500. Note that $t_{new}$ can account for systematic differences and expected dynamic variations in runtimes of tasks. This aspect can be beneficial because, as discussed above, tasks that have runtimes proportional to the amount of work (e.g., input data), are not restarted in some implementations.

Generally speaking, the following pseudocode operates by periodically generating progress reports on running tasks, and evaluating whether to restart a task in a particular slot based on the progress reports.

$\Delta$: time period between task reports (e.g., 10 seconds).
c: number of running copies of a task
E(X): For random variable X, its expected value
$\delta$: threshold probability for duplicating tasks
$\gamma$: limit on number of times a task is killed
$\alpha$: number of fastest copies of a task.
$\rho$: constant determining trade-off between using more resources vs. reducing completion time Periodically, for each running task, can kill all but the fastest $\alpha$ copies after $\Delta$ time has passed since begin.

```
while slots are available do
    if tasks are waiting for slots then
        kill, restart task if $t_{rem}$ > E($t_{new}$) + Δ, stop at γ restarts
        duplicate if P($t_{rem}$ > $t_{new}$ * c+1 / c) > δ
        start the waiting task that has the largest amount of data
            to read and/or process
    else all tasks have begun
        duplicate iff E($t_{rem}$ − $t_{new}$) > ρ Δ
    end if
end while
```

The pseudocode above summarizes an algorithm for killing and restarting a task if its remaining time to completion is so large that there is a more than even chance that a restart would finish sooner than the original copy of the task. In particular, when $t_{rem}$>estimate($t_{new}$)+$\Delta$, a task can be killed and restarted. Note that $\gamma$ is a limit on the number of times a task can be killed (e.g., 3) which can prevent thrashing.

Killing and restarting tasks, as set forth above, can reduce average job completion time. However, under some circumstances, restarting a task can incur large queuing delays with high variation. As an alternative to killing and restarting tasks, they can be duplicated to alleviate the queuing delays associated with killing and restarting.

Generally speaking, scheduling a duplicate task can result in the minimum completion time of the two copies of the task, because once one copy completes, the other copy can be killed. This can provide a safety net when estimates of task completion times are noisy, and/or the queuing delay for killing and restarting tasks is large. Thus, block 404 of method 400 and/or blocks 505/507 of method 500 can, in some instances, duplicate a task.

However, note that duplicating a task also comes with certain costs. For example, duplicating a task can utilize an extra slot, whereas a task can be killed and restarted in the same slot. Thus, a duplicated copy of a task that runs to completion can consume extra computational resources that can increase the job completion time if other outstanding tasks are prevented from starting.

For these reasons, when there are outstanding tasks and no spare slots, the algorithm above can limit scheduling of duplicate tasks to circumstances when the total amount of computation resources consumed is expected to decrease by scheduling the duplicate task. Thus, if c copies of the task are currently running, a duplicate can be scheduled when $P(t_{new} < t_{rem}*c/c+1) > \delta$. For example, $\delta$ can be set to 0.25. Thus, a task with one running copy can be duplicated when $t_{new}$ is less than half of $t_{rem}$.

Note also that, for stability, proactive scheduler 131 does not always re-duplicate tasks under certain circumstances, e.g., tasks for which a copy was recently started. Copies that have run for some time and are slower than the second fastest copy of the task can be killed to conserve resources. Hence, the number of running copies of a task can be limited, e.g., to 3, i.e., the fastest copy, the second-fastest copy, and a copy that was recently started. Conversely, when spare slots are available, duplicates can be scheduled if the reduction in the job completion time is larger than the extra resources consumed by duplicating the task, $E(t_{rem}−t_{new})>\rho\Delta$. Thus, $\rho$ allows a tradeoff between expected reduction in completion time of the task versus resources used for duplicates. Generally speaking, the higher the value of ρ is set, the fewer spare resources are used for duplicating tasks.

Note that the restart algorithm discussed above is independent of the values for its parameters. Setting γ to a larger value, and or setting δ and/or ρ to smaller values generally results in greater risk of wasteful restarts, for the potential benefit of a larger speed-up of jobs. The default values of γ, δ, and ρ discussed above can be considered relatively conservative values.

Network-Aware Placement of Tasks

As discussed above, proactive scheduler 131 can determine whether to kill and restart a task, duplicate a task, and/or start a new task based on identified causes of outlier tasks. Proactive scheduler 131 can also determine where to schedule a particular individual task based on available bandwidth in system 100. For example, proactive scheduler 131 can select which individual servers are scheduled to execute the particular individual task, based on available bandwidth and/or the amount of data that will be processed by the individual tasks.

Figure 6:
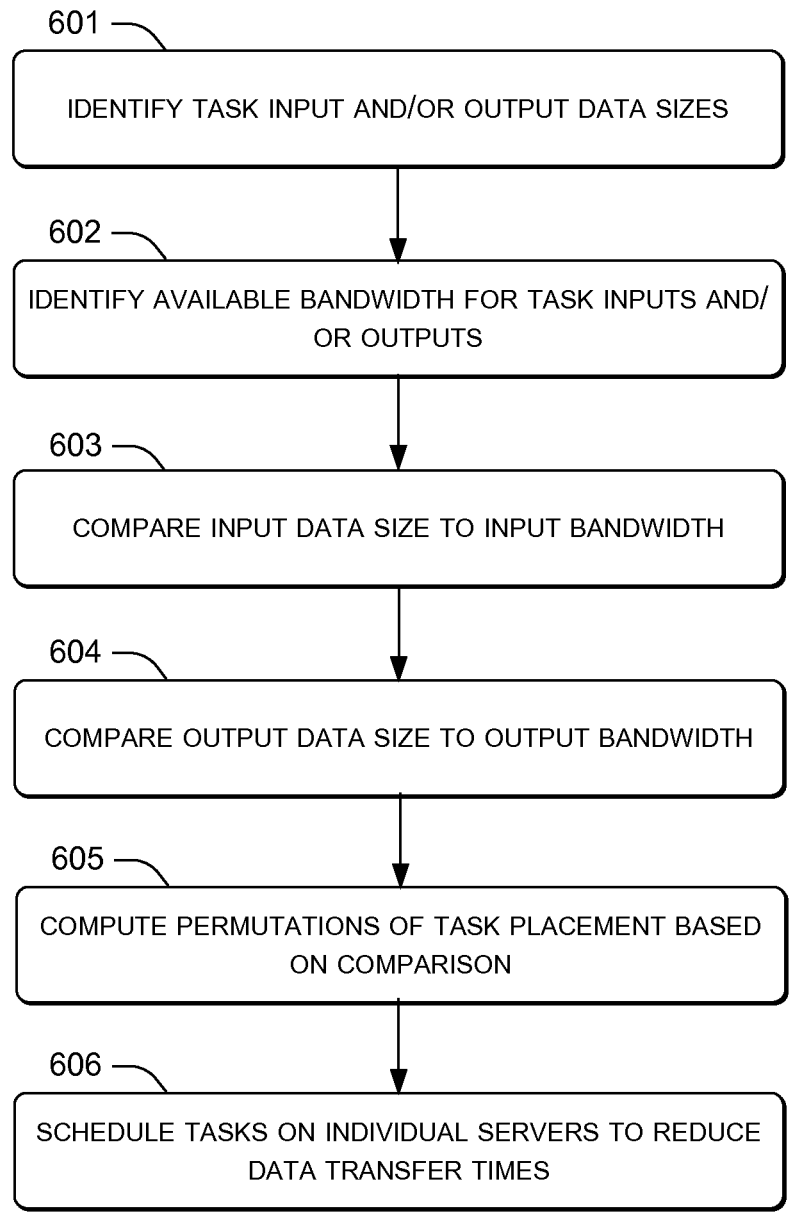

FIG. 6 illustrates a method 600 for placing scheduled tasks on individual servers. The placed tasks can be new tasks and/or copies of existing tasks, e.g., tasks that are duplicated and/or killed and restarted as discussed above. In some implementations, method 600 can be considered a detailed view of block 404 of method 400. Thus, proactive scheduler 131 can generate schedules such as 320 and/or 330 using method 600. In particular, method 600 can be used to identify the particular server that is scheduled to execute a particular task. Note, however, that method 600 is shown as being implemented by proactive scheduler 131 for exemplary purposes, and is suitable for implementation in various other contexts. Furthermore, method 600 is discussed with respect to system 100, but is also suitable for implementation in various other systems.

Input data sizes and/or output data sizes for tasks can be identified at block 601. For example, task scheduling component 207 can identify the amount of input data that is used by each scheduled task. Likewise, task scheduling component 207 can identify the amount of output data that will be produced from the inputs of each scheduled task.

Available bandwidths for task inputs and/or outputs can be identified at block 602. For example, for data input from or output to databases 160 and 170, bandwidth over network 190 can be identified. Likewise, for data received as inputs or sent as outputs across server racks (e.g., from server rack 140 to server rack 150), bandwidth over network 190 can be identified. For data that is input or output between individual servers in server racks 140 and/or 150, bandwidth over intra-rack communication links 141 and/or 151 can be identified. In some implementations, bandwidth is identified by periodically measuring available bandwidth for individual communications between any of devices 130-170. In other implementations, bandwidth can be extrapolated from measurements at the start of a task or assumed to be the same across collections of links.

Input data sizes can be compared to input bandwidths at block 603. For example, task scheduling component can divide the input data amount for a particular task by the input bandwidth available for individual servers 140(1 . . . N) and/or 150(1 . . . N). This computation can yield an estimate of how long it will take a particular task to receive its input data if executed on a particular individual server.

Output data sizes can be compared to output bandwidths at block 604. For example, task scheduling component 207 can divide the output data amount for a particular task by the output bandwidth available for individual servers 140(1 . . . N) and/or 150(1 . . . N). This computation can yield an estimate of how long it will take a particular task to send its output data to another task, if executed on a particular individual server.

Permutations of task placement can be computed at block 605. For example, task scheduling component 207 can compute each permutation of individual tasks placed on individual servers, and determine the total data transfer time for the input and output data for each permutation. Task scheduling component 207 can do so, for example, by summing the individual input and/or output time estimates discussed above.

Tasks can be scheduled on individual servers at block 606. For example, the total data transfer time can be reduced or even minimized by selecting a permutation from block 605 that is estimated to have a relatively low (e.g., minimum) amount of time for input and/or data transfers.

As discussed above, proactive scheduler 131 can also schedule tasks on particular servers based on bandwidth constraints, using method 600. As a specific example, consider a MapReduce™ implementation where a reducing phase is preceded by a mapping phase. Generally speaking, the mapping phase can include reading data from databases 160 and 170 as key-value pairs, and producing intermediate values. The reduce phase can include combining the intermediate values into final values.

Often, reduce tasks read data across server racks. A rack with too many reduce tasks can exhibit bandwidth congestion, and thus tasks can run more slowly and be identified as outliers. However, by placing tasks on individual servers and server racks in view of the impact of congested downlinks, the impact of the congestion can be mitigated. The following discussion presents an algorithm for identifying where to place particular tasks, and can also be implemented by proactive scheduler 131. The following algorithm represents a specific implementation of method 600.

Consider a reduce phase with N tasks running on a cluster of servers with R racks. The reduce phase can take an input matrix $I_{N,R}$ that specifies the size of input available on the server racks for each reduce task. Furthermore, note that the sizes of the map outputs in each rack are, in some implementations, known to proactive scheduler 131 prior to placing the individual tasks of the subsequent reduce phase on the server racks.

For each permutation of reduce tasks allocated across the racks, let the data to be moved out (on the uplink) and read in (on the downlink) on the $i^{th}$ rack be $d^i_u$ and $d^i_v$, respectively. Furthermore, let the available bandwidth for the uplink be $b^i_u$ and the available bandwidth for the downlink be $b^i_d$. For each rack, proactive scheduler 131 can compute two terms $c_{2i-1} = d^i_u / b^i_u$ and $c_{2i} = d^i_v / b^i_d$. The first term ($c_{2i-1}$) can represent the ratio of outgoing traffic and available uplink bandwidth, and the second term ($c_{2i}$) can represent the ratio of incoming traffic and available downlink bandwidth. Proactive scheduler 131 can compute an optimal value over all placement permutations that specifies the rack location for each task, as arg min $\max_j c_j$, j=1 . . . 2n, by reducing (e.g., minimizing) the total data transfer time.

The available bandwidths $b^i_u$ and $b^i_d$ can change with time and as a function of other jobs in system 100. Proactive scheduler 131 can estimate these bandwidths as follows. Reduce phases with a small amount of data can finish quickly, and the bandwidths can be assumed to be constant throughout the execution of the phase. Phases with a large amount of data can take longer to finish, and the bandwidth averaged over their long lifetime can be assumed to be equal for all links between the various devices in system 100.

For phases other than reduce, proactive scheduler 131 can place tasks close to their data. Note that, by accounting for the cost of moving data over low bandwidth links in $t_{new}$, proactive scheduler 131 can prevent copies of tasks from being started at locations where the copy is unlikely to finish before existing copies of the task. This can prevent wasting of computation resources in system 100.

Such network-bandwidth aware placement of tasks to servers can be done by the scheduling servers of each job independently of other jobs running in the cluster or, in implementations that have a cluster-wide scheduling server for all jobs, can be done at the cluster-wide scheduler.

Avoiding Recomputation

Recomputing data for a job can be costly, because computational resources of system 100 that are dedicated to recomputing a particular task can be unavailable to compute data for other tasks. To mitigate costly recomputations that can stall a job, proactive scheduler 131 can protect against interim data loss by replicating task output. For example, the output produced by a completed task on an individual server can be copied and stored on another individual server. Thus, if the output of the task is corrupted or lost on the individual server that executed the task, the replicated copy of the output can be retrieved from the individual server with the copy.

Figure 7:
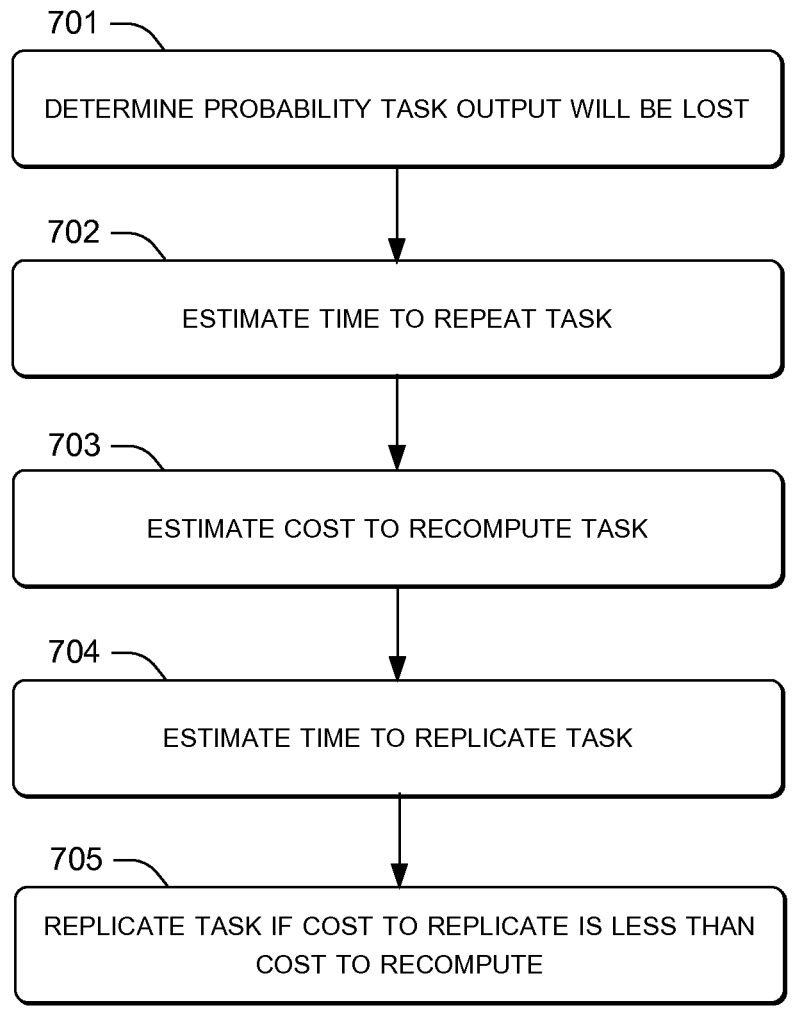

FIG. 7 illustrates a method 700 for determining whether to replicate task output, for example output of a completed task. In some implementations, proactive scheduler 131 can implement method 700 concurrently with method 400. Note, however, that method 700 is shown as being implemented by proactive scheduler 131 for exemplary purposes, and is suitable for implementation in various other contexts. Furthermore, method 700 is discussed with respect to system 100, but is also suitable for implementation in various other systems.

The probability that output of a task will be lost can be determined at block 701. For example, individual servers 140(1 . . . N) and/or 150(1 . . . N) can be monitored by proactive scheduler 131 over time for faults that can cause data loss, such as bad disk sectors, unplanned shutdowns and/or restarts, or other failures. Individual servers with more faults over time can be determined to have higher probabilities that task outputs will be lost.

The estimated time to repeat a task can be determined at block 702. For example, the amount of data input to a task can be considered proportional (e.g., linear) to the amount of time to repeat the task. In some implementations, other tasks that perform similar operations can be monitored by proactive task scheduler 131 for the amount of time they take to execute for given input sizes, and the estimated time to repeat a task can be determined based on a moving average of the monitored execution times. In some implementations, interpolation and/or extrapolation from previous task measurements can be used to estimate the time to repeat a task.

The estimated cost to recompute a task can be determined at block 703. For example, proactive scheduler 131 can determine the estimated cost to recompute a task based on the estimated probability that the output of the task will be lost, as well as the estimated time to repeat the task. In some implementations, the estimated cost to recompute the task can be the product of the estimated probability of loss and the estimated time to repeat the task.

The estimated time to replicate a task can be determined at block 704. For example, proactive scheduler 131 can estimate the amount of time it will take to transfer the output data for the task to another individual server. This estimated time can be computed in a manner similar to that discussed above with respect to method 600, e.g., by dividing the amount of output data by the available bandwidth to move the output data to other individual servers over network 190 and/or intra-rack communication links 141 and/or 151.

The task output can be replicated at block 705. For example, the cost to replicate the task output can be compared to the cost to recompute the task output. If the cost to replicate the task output is less than the cost to recompute, then the task output can be replicated by copying the output data to another individual server. Otherwise, in some implementations, the task output is not replicated.

As discussed above, proactive scheduler 131 can act early by replicating those outputs whose cost to recompute exceeds the cost to replicate. Proactive scheduler 131 can estimate the cost to recompute as the product of the probability that the output will be lost and the time to repeat the task. A specific implementation consistent with method 700 is discussed below.

The probability of loss can be estimated for a device such as an individual server over a relatively long period of time. The time to repeat the task, $t_{redo}$, can be computed via a recursive adjustment that accounts for the data inputs to a task also being lost. The cost to replicate a task is, in some implementations, the time to move the data for the task to another individual server in a rack, e.g., the same rack that the task is currently executing in.

Generally speaking, output of a task can be replicated to reduce the probability of losing the output, in the event of a failure of an individual server. Tasks with many-to-one input patterns, e.g., tasks that receive input from multiple sources, can have higher recomputation costs. Consider the time to replicate output of a particular task as $t_{rep}$, which can be calculated based on the available bandwidth within a rack, e.g., over intra-rack communication links 141 and 151. The time to repeat a task can be represented as $t_{redo}$. In some implementations, a task is only replicated if $t_{redo} > t_{rep}$, as discussed in more detail below.

To calculate $t_{redo}$, proactive scheduler 131 can do the following. The data loss probability of a given task i can be represented as $r_i$. Likewise, the time taken by the task can be represented as $t_i$. To determine these values, proactive scheduler 131 can recursively look at prior tasks that ran on this server (for $r_i$) and at prior tasks in this phase (for $t_i$), for example.

Generally speaking, replicating output can reduce the likelihood of recomputation to the case when the original and the replicated outputs are both unavailable. If a task reads input from many tasks (e.g., a reduce phase task), $t_{redo}$ can be higher since any of the inputs needing to be recomputed can stall the task's recomputation. Proactive scheduler 131 can assume that if multiple inputs are lost, the inputs can be recomputed in parallel. In some implementations, proactive scheduler 131 can also assume that the task is only stalled by the longest input. Since the overall number of recomputes can be small under these circumstances, this is a fair approximation of practice.

In effect, the algorithm above can replicate tasks at key places in a job's workflow—when the cumulative cost of not replicating many successive tasks builds up, when some tasks execute on individual servers with high failure rates (high $r_i$), and/or when the output is so small that replicating the task would cost little (low $t_{rep}$).

Further, to avoid excessive replication, proactive scheduler 131 can limit the amount of data replicated to a set limit or threshold, e.g., 10% of the data processed by the job. This limit can be implemented by using tokens to track when a task from a job is assigned to a slot. The number of tokens for a task can be proportional to the amount of data processed by each task. Task output that satisfies the above cost-benefit check ($t_{redo} > t_{rep}$) can be replicated when an equal number of tokens are available. Tokens can be deducted when data is replicated.

Thus, proactive scheduler 131 can proactively recompute tasks whose output and replicas, if any, have been lost. Because recomputations on an individual server often are clustered by time, proactive scheduler 131 can consider a recompute to be the onset of a temporal problem and that future requests for data on this individual server are likely to fail. Such pre-computation can decrease the time that a dependent task (e.g., from a subsequent phase) will have to wait for lost input to be regenerated. Proactive scheduler 131 can also impose a budget on the extra computation cycles used for pre-computation. Together, the probabilistic replication and pre-computation discussed above can mitigate the costs associated with data loss.

Task Ordering

As discussed above, in some implementations, proactive scheduler 131 can schedule tasks with the largest data inputs to be processed before other tasks. More generally, proactive scheduler 131 can order tasks based on the amount of time the tasks will take to complete. As discussed above, workload imbalance caused by skewed data input sizes can cause tasks to become outliers.

Figure 8:
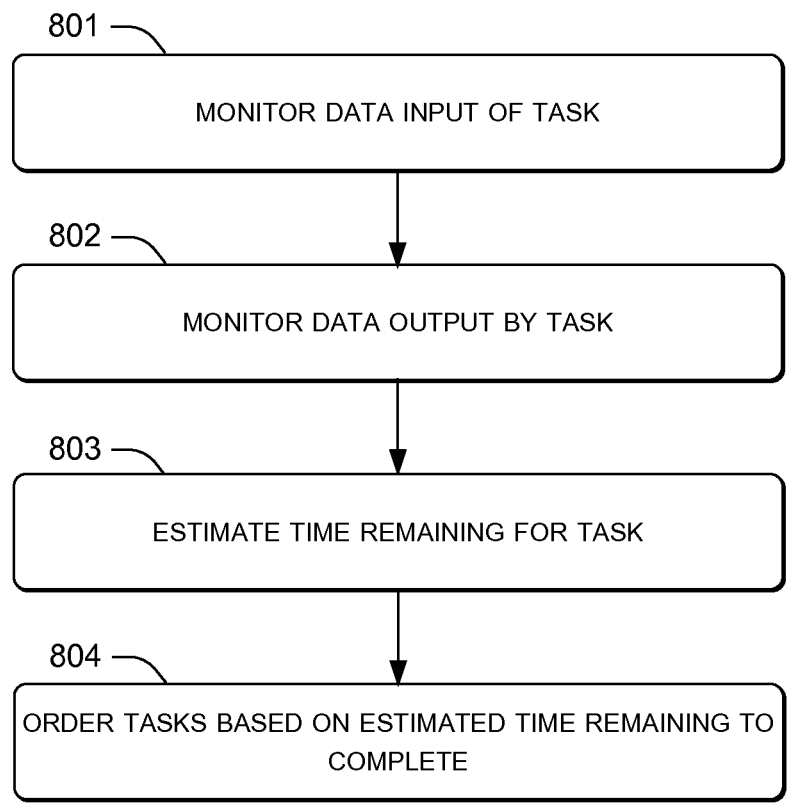

FIG. 8 illustrates a method 800 for determining whether to replicate task output, for example of a completed task. In some implementations, proactive scheduler 131 can implement method 800 as part of method 400, e.g., as part of block 404. Note, that method 800 is shown as being implemented by proactive scheduler 131 for exemplary purposes, and is suitable for implementation in various other contexts. Furthermore, method 800 is discussed with respect to system 100, but is also suitable for implementation in various other systems.

Data inputs to tasks can be monitored at block 801. For example, proactive scheduler 131 can receive the aforementioned progress reports, which can indicate how much input data a task has read so far. In some implementations, the progress report can also indicate from where the input was read, the bandwidth available for accessing the input data, and how much input data is left to be read.

Data outputs of tasks can be monitored at block 802. For example, proactive scheduler 131 can also receive this information from the aforementioned progress reports, which can indicate how much output data a task has written so far. In some implementations, the progress report can also indicate where the output data was written to, the bandwidth available for writing the output data, and how much data is left to be output.

Block 803 can include estimating the amount of time remaining for a task to complete. For example, proactive scheduler 131 can estimate the amount of time for the task to complete based on the amount of input data that is left to be read by the task, how fast the input data is being read by the task, the amount of data that is left to be output by the task, and/or how fast the data is being output by the task.

Block 804 can include ordering tasks based on how much time is left for the tasks to complete. For example, proactive scheduler 131 can schedule new tasks and/or tasks for restart or duplication based on how long the task is expected to take before completion. In some implementations, the tasks can be ordered so that tasks that will take longer to complete are scheduled before tasks that will take less time to complete. For example, the longest task can be scheduled first and the shortest task can be scheduled last. Further, in some implementations, tasks can be ordered based on the amount of input data for the task that have not been processed, and the tasks with the more input data to process can be scheduled ahead of tasks with less input data to process. For example, the task with the most input data to process can be scheduled first, and the task with the least input data to process can be scheduled last.

A specific algorithm is set forth below for implementing method 800.

For example, consider a set of n tasks, s slots and data sizes d[1 ... n]. Computing an optimal schedule that minimizes the job completion time can be computationally difficult or infeasible, depending on the number of tasks and slots. Nevertheless, proactive scheduler 131 can reduce job completion times by scheduling tasks in a phase in descending order of their data size. If the optimal completion time is $T_O$:

Theorem 1

$$T/T_O \leq 4/3 - 1/3s$$

Thus, scheduling tasks with the longest processing time first can approximate the optimal task scheduling. Periodically, running tasks can inform proactive scheduler 131 of their status, including how many bytes each task has read or written thus far. Combining progress reports with the size of the input data that each task has to process, d, proactive scheduler 131 can predict how much longer the task will take to finish as follows:

$$t_{rem} = t_{elapsed} * d/d_{read} + t_{wrapup}$$

The first term, $t_{elapsed} * d/d_{read}$, can represent the remaining time to process data, where $d_{read}$ represents the rate at which input data is being processed by the task. The second term, $t_{wrapup}$, can represent the time to finish computing output after the input data has been read, and can be estimated from the behavior of earlier tasks in the phase. Proactive scheduler 131 can use interpolation and/or extrapolation from execution times and data sizes of previous tasks. However, because tasks may speed up or slow down, proactive scheduler 131 can also use a moving average.

To be robust against lost progress reports, when a task has not provided a progress report for a certain period of time, proactive scheduler 131 can increase $t_{rem}$ by assuming that the task has not progressed since its last report. Proactive scheduler 131 can also estimate $t_{new}$, the distribution over time that a new copy of the task will take to run, as follows:

$$t_{new} = processRate * locationFactor * d + schedLag$$

The first term, processRate, can represent a distribution of the process rate, i.e., $\Delta time/\Delta data$, of the tasks in a particular phase. The second term, locationFactor, can represent a relative factor that accounts for whether a candidate server for running this task is persistently slower (or faster) than other machines or has smaller (or larger) capacity on the network path to where the input data for the task are located. The third term, d, can represent the amount of data the task has to process. The last term, schedLag, can represent the average delay between a task being scheduled and when the task gets to run.

To summarize, implementations set forth herein can schedule tasks in view of the various considerations discussed above. For example, outlier tasks can be evaluated to determine their causes, and restart and/or duplicate tasks can be scheduled depending on the determined causes. Moreover, tasks can be scheduled in view of expected completion times, e.g., based on the amount of input data each task has to process before completion. Some implementations can also consider available bandwidth for inputting and outputting data by tasks. Furthermore, some task outputs can be replicated in view of the expected cost to recompute the task outputs.

CONCLUSION

The techniques, methods, devices, and systems disclosed herein are consistent with various implementations. Generally speaking, the various processing discussed above with respect to the devices shown in FIG. 1 can be distributed across one or more other devices, and/or consolidated on a single device. For example, in the discussion above, scheduling server 130 initiated jobs responsive to receiving queries from client devices 110 and/or 120. However, jobs can be initiated by a device other than scheduling server 130, e.g., by an individual server and/or another device operably connected to scheduling server 130. Moreover, the processing described herein for proactive scheduler 131 can be distributed across several scheduling servers, and/or performed in a distributed manner on one or more individual servers.

As another example, in the discussion above, individual servers 140(1) through 140(N) and 150(1) through 150(N) are connected by intra-rack communication links 141 and 151, respectively. In a representative modern server system, communication links 141 and 151 can be implemented as top-of-rack switches with full backplane bandwidth that is generally higher than bandwidth between racks 140 and 150 over network 190. However, the implementations discussed herein can be generalized to any collection of devices where there are varying amounts of bandwidth between individual devices, correlated likelihoods of failure on two or more individual devices, etc.

Likewise, while FIG. 1 shows databases 160 and 170 as being separate from server racks 140 and 150, in many implementations the techniques disclosed herein will use a distributed storage service that distributes data storage across the individual servers. As a particular example, MapReduce™ implemenations will often use such a distributed storage service. Nevertheless, as shown in FIG. 1, the techniques disclosed herein can also be used in implementations that use separate physical databases.

Although techniques, methods, devices, systems, etc., pertaining to the above implementations are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A system comprising:
    one or more processing devices; and
    one or more computer-readable storage media storing instructions which, when executed by the one or more processing devices, configure the one or more processing devices to:
        identify an outlier task from a plurality of tasks of a phase of a job based on corresponding runtimes of the plurality of tasks, the outlier task being identified while the outlier task is executing and taking longer to complete than other tasks from the phase of the job, wherein the plurality of tasks share the same code;
        make a determination whether the outlier task has more input data to process than the other tasks of the phase of the job;
        in a first instance when the determination is that the outlier task has more input data to process than the other tasks of the phase of the job, continue to let the outlier task execute without scheduling a copy of the outlier task responsive to the determination; and
        in a second instance when the determination is that the outlier task does not have more input data to process than the other tasks of the phase of the job
        compare an estimated remaining time for the outlier task to complete to an estimated time for the copy of the outlier task to complete, and
        when the estimated time for the copy of the outlier task to complete is less than the estimated remaining time for the outlier task to complete, schedule the copy of the outlier task.

2. The system according to claim 1, wherein the instructions further configure the one or more processing devices to:
    in the second instance, determine whether a cause of the outlier task is contention for resources by evaluating progress reports reflecting processor utilization, memory utilization, or both on a server that is currently executing the outlier task.

3. The system according to claim 1, wherein the outlier task executes concurrently with an individual other task from the plurality of tasks.

4. The system according to claim 2, wherein the instructions configure the one or more processing devices to:
    responsive to determining that the cause of the outlier task is contention for resources, schedule the copy of the outlier task on a different server than the outlier task.

5. The system according to claim 4, wherein the instructions further configure the one or more processing devices to:
    schedule at least one subsequent task from a subsequent processing phase of the job after completion of the outlier task.

6. The system according to claim 1, wherein the instructions further configure the one or more processing devices to:
    schedule the plurality of tasks in a plurality of processing slots, the outlier task executing within an individual processing slot.

7. The system according to claim 6, wherein the instructions further configure the one or more processing devices to:
    determine whether there is an available processing slot; and
    in the second instance, begin executing the copy of the outlier task in the available processing slot while the outlier task continues executing within the individual processing slot.

8. The system according to claim 1, wherein the phase is a reducing phase of the job and the reduce phase is preceded by a mapping phase.

9. The system according to claim 1, embodied as a scheduling server that initiates the plurality of tasks on other servers.

10. The system according to claim 1, wherein the instructions further configure the one or more processing devices to, in the second instance:
    determine the estimated remaining time for the outlier task to complete based on an amount of the input data that the outlier task has to process and a rate at which the outlier task processes the input data.

11. The system according to claim 10, wherein the instructions further configure the one or more processing devices to, in the second instance:
    determine the estimated time for the copy of the outlier task to complete based on processing rates at which the other tasks in the phase are processing the input data.

12. The system according to claim 10, wherein the instructions further configure the one or more processing devices to:
    determine the estimated time for the copy of the outlier task to complete based on the amount of the input data that the outlier task has to process.

13. A system comprising:
one or more processing devices; and
one or more computer-readable storage devices comprising instructions which, when executed by one or more processing devices, cause the one or more processing devices to:
monitor execution of a plurality of tasks associated with a job, the plurality of tasks comprising an individual task that is processing input data;
after the individual task has already processed some of the input data and is continuing to process remaining input data:
determine a rate at which the individual task is processing the input data and an amount of the remaining input data that the individual task has yet to process,
determine an estimated remaining time for the individual task to complete based on the rate at which the individual task is processing the input data and the amount of the remaining input data,
determine a predicted completion time for a new copy of the individual task,
determine an estimated probability that the new copy of the individual task will complete sooner than the individual task based on the estimated remaining time for the individual task to complete and the predicted completion time for the new copy of the task, and
while the individual task continues executing, schedule the new copy of the individual task that is currently executing when the estimated probability that the new copy of the individual task will complete sooner than the individual task exceeds a threshold.

14. The system according to claim 13, wherein the instructions further cause the one or more processing devices to:
schedule the new copy of the individual task to run concurrently with the individual task without killing and restarting the individual task.

15. The system according to claim 13, wherein the instructions further cause the one or more processing devices to:
determine whether an available processing slot is available for scheduling the new copy of the individual task; and
schedule the new copy of the individual task when there is an available processing slot.

16. The system according to claim 14, wherein the instructions further cause the one or more processing devices to:
limit a number of copies of the individual task to a fixed number.

17. A method performed by at least one computing device, the method comprising:
determining an estimated probability that output data of a completed task will be lost due to a fault on a server that executed the completed task, wherein the completed task has processed input data to obtain the output data;
determining an estimated time to repeat the completed task based on an amount of the input data that was processed by the completed task;
determining a cost to recompute the completed task based on both the estimated probability that the output data of the completed task will be lost and the estimated time to repeat the completed task;
determining another estimated time to replicate the output data of the completed task by transferring the output data to another server;
comparing the another estimated time to replicate the output data to the cost to recompute the completed task to determine whether to replicate the output data on the another server; and
replicating the output data on the another server when the another estimated time to replicate the output data is less than the cost to recompute the completed task.

18. The method of claim 17, further comprising:
determining the cost to recompute the completed task as a product of the estimated probability that the output data of the completed task will be lost and the estimated time to repeat the completed task.

19. The method of claim 17, wherein the server and the another server both physically occupy the same server rack.

20. The method of claim 17, further comprising:
examining prior tasks that ran on the server to determine the estimated probability that the output data will be lost.

* * * * *